United States Patent
Frantz et al.

[11] Patent Number: 5,935,379
[45] Date of Patent: Aug. 10, 1999

[54] HEAT-SEALING WHEELS FOR FORMING A LONGITUDINAL WELD OR SEAL IN SEAMS OF PLASTIC FILMS

[75] Inventors: David Louis Frantz, Hockessin; Walter Ernest Lewis, Newark, both of Del.; Robert Vincent Jeral, Philadelphia; Frederick Henry Fiesser, Furlong, both of Pa.

[73] Assignee: E. I. du Pont de Nemours and Company, Wilmington, Del.

[21] Appl. No.: 09/032,478

[22] Filed: Feb. 27, 1998

[51] Int. Cl.⁶ .................................................. B30B 15/00
[52] U.S. Cl. .................... 156/555; 156/582; 156/583.1; 100/334; 100/160
[58] Field of Search ................................. 156/555, 580, 156/582, 583.1; 100/327, 334, 155 R, 160

[56] References Cited

U.S. PATENT DOCUMENTS

| | | | |
|---|---|---|---|
| 4,746,391 | 5/1988 | Heyse et al. | 156/359 |
| 4,808,150 | 2/1989 | Herrington et al. | 493/394 |
| 5,411,625 | 5/1995 | Focke et al. | 156/359 |

FOREIGN PATENT DOCUMENTS

WO 93/23234  5/1993  WIPO ............................ B29C 53/50

*Primary Examiner*—James Sells

[57] ABSTRACT

A heat seal wheel for use with a heat sealing apparatus associated with a continuous packaging machine, for forming a longitudinal seal in a flat sheet of flexible film. The heat seal wheel is characterized by a planar heater comprising a laminar resistive heating element sandwiched in between a top layer and a bottom layer of a thermally conductive and electrically insulative material. The top layer is bonded to the bottom surface a bearing disk, in contact with and supporting a rotating heat seal wheel for conductively heating the seal wheel and producing a heat seal in the seams of a moving web of plastic film.

6 Claims, 4 Drawing Sheets

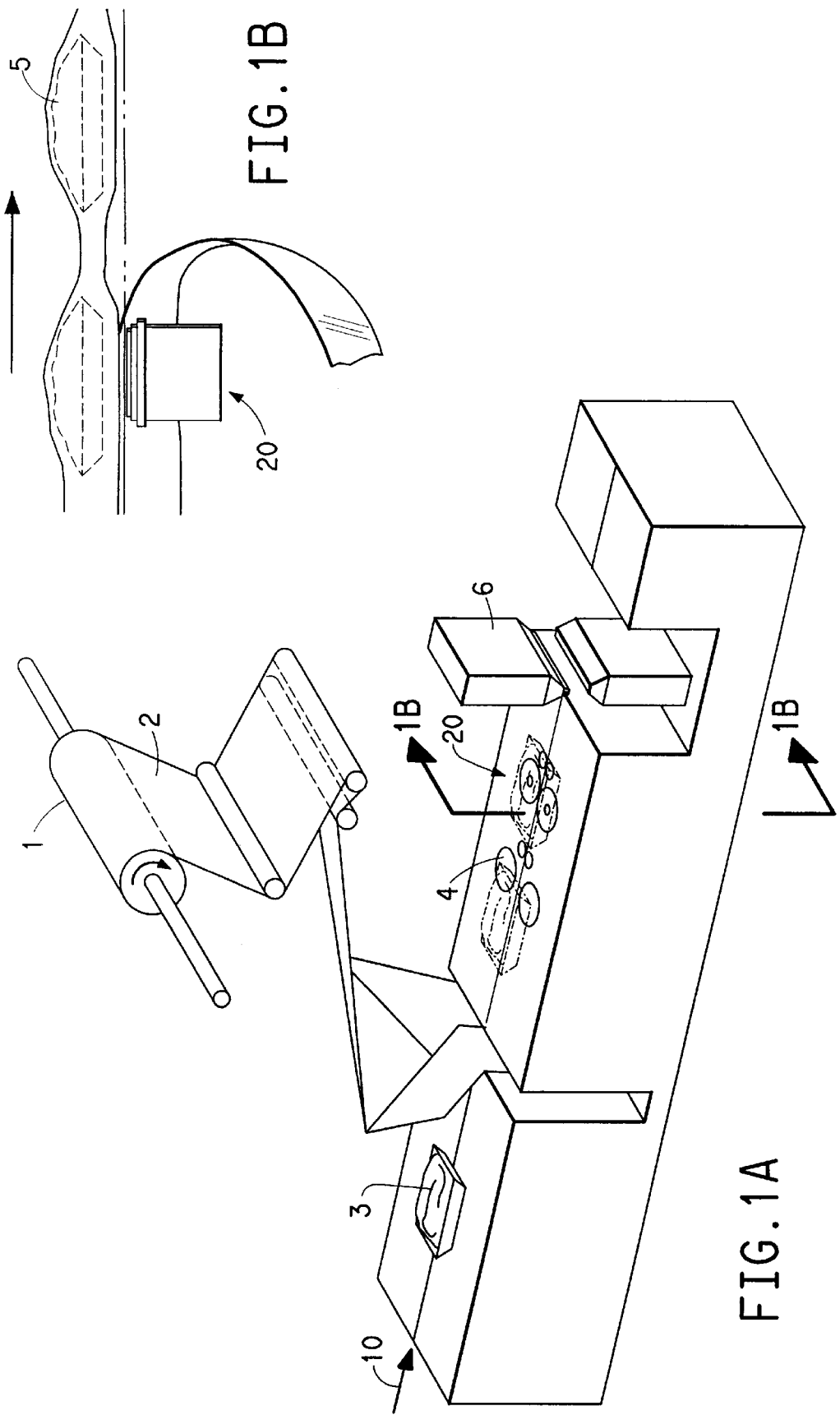

HEAT-SEALING WHEELS FOR FORMING A LONGITUDINAL WELD OR SEAL IN SEAMS OF PLASTIC FILMS

FIELD OF THE INVENTION

This invention relates to a heat seal wheel for use with a heat sealing apparatus associated with a continuous packaging machine, for forming a longitudinal seal in a flat sheet of flexible film.

BACKGROUND OF THE INVENTION

Sealing plastic film around objects provides an inexpensive packaging alternative to individually made and designed packaging such as paper or plastic cartons. The film in effect becomes an individual packaging container in the form of a sealed bag. Various types of films are used in this packaging method. The film may be stretch film, shrink film, or hard film, which neither stretches readily nor is adapted to heat shrinking significantly. Many different items are packaged in these plastic bags such as meat and poultry parts, which are 'trayed' then bagged in the plastic film. The "bags" are commonly formed from a continuous roll of film sheet around the trayed items.

With reference to FIG. 1A, there is shown schematically a typical packaging machine as indicated by reference number 10. The conventional product-packaging machine 10 as shown utilizes a continuous roll 1 of heat sealable film 2. A conveyor moves the product trays 3 overwrapped with film 2 in a longitudinal direction. The overwrapped tray is fed over various symmetrically arranged rollers 4 which fold the overwrapping film to give it a tubular form, with the two side edges of the film mating along a vertical plane longitudinal with the running direction of the film 2. As the overwrapped tray 2 is passed over the sealing apparatus 20, the heat sealing wheels of the apparatus 20 (at a pre-selected temperature) welds the mating edges of film longitudinally below the overwrapped tray 2 forming a tubed tray 5, with a bottom seal on each successive packaged tray. The sealed tube 5 is then sealed (or cut and sealed) in the direction transverse to the direction of the moving tube and tray by transverse sealer 6, forming individually packaged trays. The direction in which the film, the packaged product, and the heat seal below the packaged tray forming a sealed tube travels is referred to as the 'machine' direction or the 'longitudinal' direction. The direction of sealing and cutting of the sealed tube forming individually packaged trays is called the 'transverse' or 'cross' direction.

The above description for transport of the products, synchronization, and folding of the plastic film is known in the art and common in many continuous packaging machines, and is not considered necessary to explain here in greater detail. However, there are major differences in the apparatuses used in forming the longitudinal seals. Published patent application no. WO 93/23234 entitled "Vacuum Advance System for High Speed Contact Sealer for Forming a Flat Film into a Tube," discloses a longitudinal sealing system employing a heated endless band which passes over a heater bar and rollers at each end thereof. The heated band is impinged directly against the seam defined by the overlapping edges of the film, and the heater bar effects the sealing of the seam. Adhesive applicators or rollers can also be used in this sealing system to further effect the sealing of the overlapping film edges.

U.S. Pat. No. 4,746,391 similarly discloses the use of an electrically heated heating band to seal the folded film under heat and pressure applied by a heated band. Electrical current is supplied to endlessly revolving heating band via feed rollers and from a current source for resistance heating. As a result of thermal conduction via the steel heating band, the sealing heat is transmitted to the films to be sealed or welded to one another.

Another approach to longitudinally heat-sealing plastic film is passing the packaging film through a heated nip formed by two seal wheels as shown in FIG. 1. The heat seal wheels of the prior art are illustrated in FIGS. 2A and 2B. In the prior art, heat is provided to each rotating seal wheel 11 by a donutshaped electrical resistance heater 13. The heater 13 is a metal block cast around a coiled electrical heating element with all surfaces of the heater 13 being essentially at the same heating temperature. Seal wheel 11 extends downward defining a circular skirt 12 around heater block 13. Skirt 12 is necessary to keep excess trims from sticking to and melting on heater block surface. Trims are lateral cut-off edges of overlapped film. Heat is transferred from heater block 13 to seal wheel 11 through a metal disk 14, which acts as a thrust bearing. Compression springs (not shown) arranged equally spaced around a circle concentric to the heater axis, force the heater block 13, metal bearing disk 14, and seal wheel 11 in contact with one another to facilitate heat transfer.

As packages overwrapped with plastic film move on a conveyor belt over the heated seal wheels with the edges of the film extend down in the elongate direction overlapping one another, the two heated wheels 11 apply pressure and heat on the overlapped edges of the film forming a longitudinal seal underneath the packages. As the seal is being formed, the rotating movement of the seal wheels nips and severs the trim from the longitudinal seal line formed underneath the overwrapped packages.

There are various problems frequently encountered with the heat seal wheel assembly of the prior art. One is that it takes a long time to start-up the conveyor line. As the rotating surfaces of the seal wheels 11 are heated, some of that heat is also transferred to the wheel skirt 12 and the surrounding environment. Thus, more energy and time is required to heat the sealing edges of the seal wheels 11 to a predetermined temperature as the result of the convection and radiation heat loss from the heating block 13 to the surroundings. The other problems are maintenance in nature. The bearing disk 14, being sandwiched between the rotating seal wheel 11 and heating block 13, has to be kept greased and replaced on a frequent basis due to wear thus causing frequent shut-downs. Another frequent cause for shut-downs is due to trim wraps. As the seal wheel 11 is heated, the outer surface of seal wheel skirt 12 is heated as well due to its close proximity to heater block 13. It has been found that when trim tension is lost, the trim or excess lateral cut-off edges of overlapped film will curl, melt and stick to the rotating wheel skirt 12 and shut down the machine. Machine operator has to clear the trayed products off the line, remove the trip wraps, and restart the machine.

Accordingly, it is an object of this invention to provide a novel construction for a seal wheel heat transfer system that is simple in design and operation, and eliminates costly shut-down problems experienced in the prior art.

SUMMARY OF THE INVENTION

The invention, accordingly, resides in an apparatus intended to provide a longitudinal seal in any type of heat-sealable film.

A heating apparatus of the present invention is characterized by a planar heater comprising a laminar resistive heating element sandwiched in between a top layer and a bottom layer of a thermally conductive and electrically insulative material, the top layer being bonded to the bottom surface of a bearing disk, in contact with and supporting a rotating heat seal wheel for conductively heating the seal wheel and producing a heat seal in the seams of a moving web of plastic film.

BRIEF DESCRIPTION OF THE DRAWINGS

FIG. 1A is a perspective view illustrating a typical packaging machine.

FIG. 1B is an end view of the heat seal wheels taken in the direction of line 1B of FIG. 1A to produce sealing "bags."

DESCRIPTION OF THE PREFERRED EMBODIMENT

Referring to again to FIG. 1A which illustrates an exemplary packaging machine in which the heat seal wheels of the present invention may be employed. A conveyor moves product trays 3 overwrapped with film 2 in a longitudinal direction toward various symmetrically arranged rollers 4 which fold the overwrapping film to give it a tubular form. The sealing apparatus 20 welds the mating edges of the film tube, seals the overlapped film edges then severs the excess film edges, forming a longitudinal seal below the packaged items.

Figure 2A:
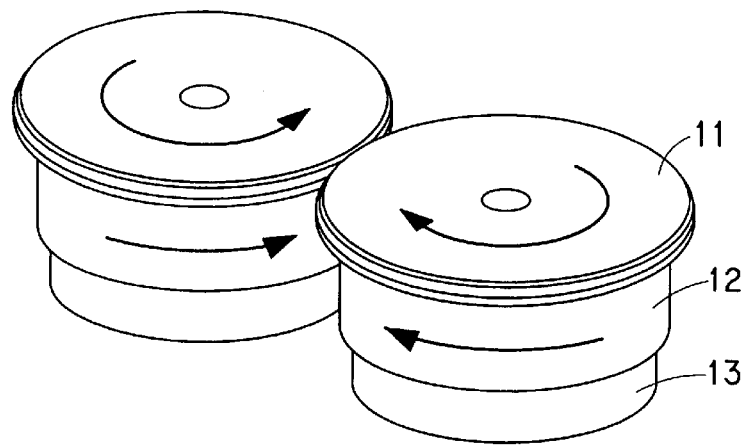
FIG. 2A is a perspective view of a seal wheel of the prior art.
Figure 2B:
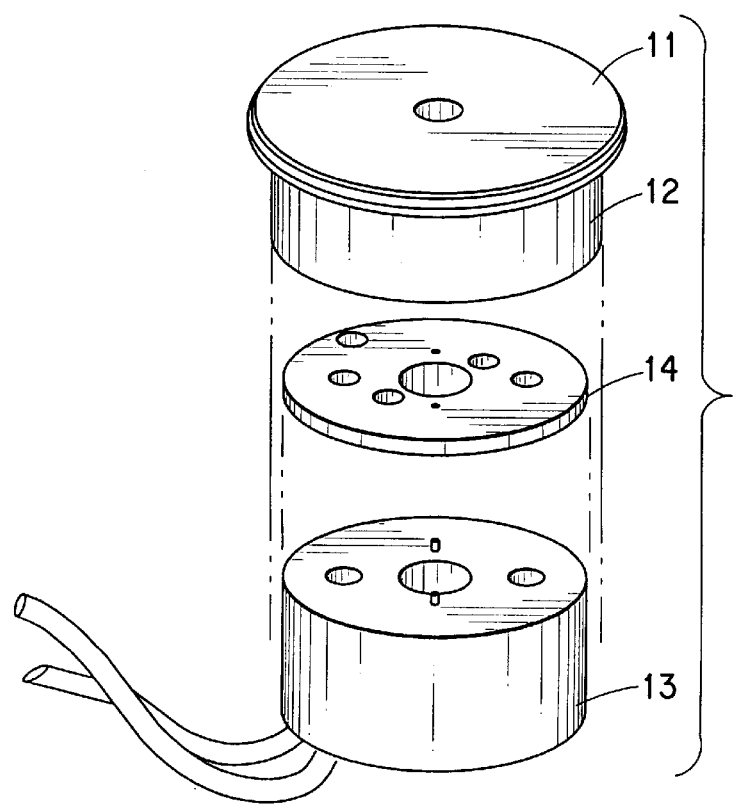
FIG. 2B is an exploded view showing the assembly of the heat seal wheel in FIG. 2A.
Figure 3A:
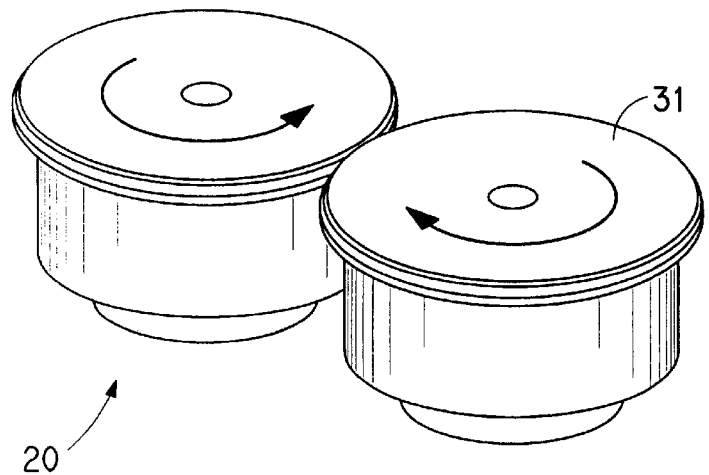
FIG. 3A is a perspective view of the seal wheel assembly of the present invention.
Figure 3B:
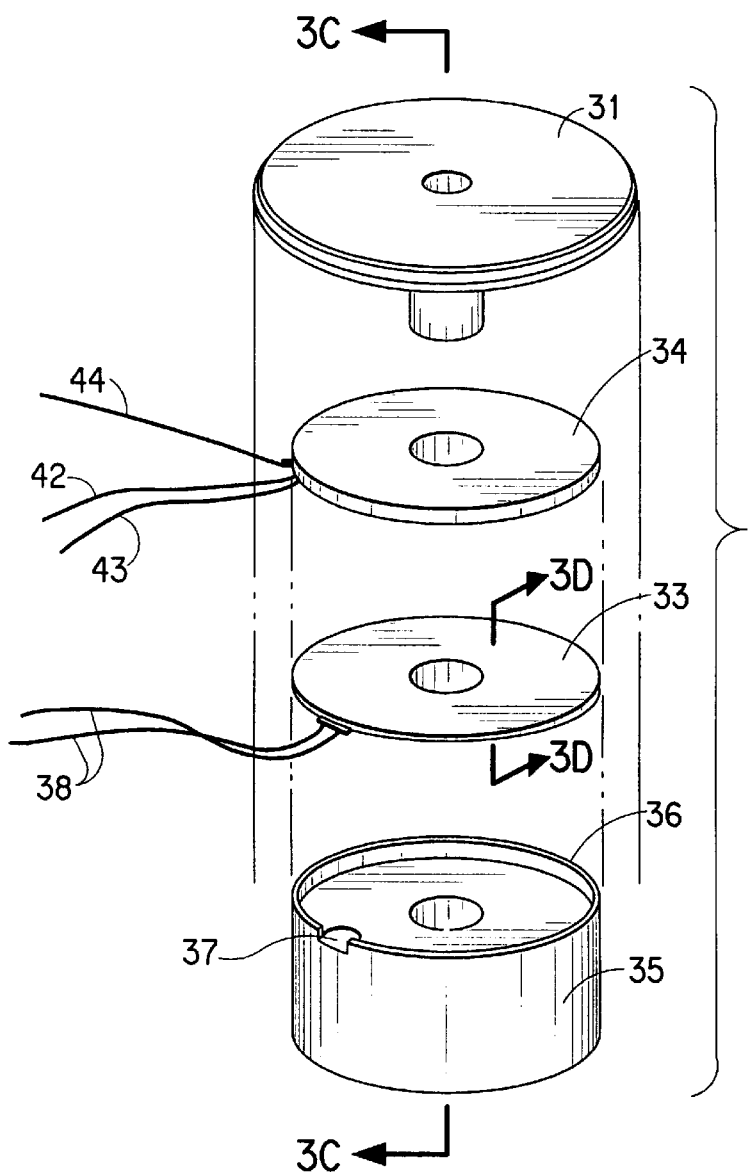
FIG. 3B is an exploded view showing the construction of heat seal wheel assembly in FIG. 3B.

FIG. 3A is a perspective view of the seal wheels of the present invention as employed in the sealing apparatus 20, and FIG. 3B is an exploded view showing the various elements of the seal wheel assembly 20. Heat is provided to each rotating seal wheel 31 by a planar heating element 33. A temperature sensor 44 is bonded to the backside of bearing disk 34 to provide a signal for controlling the heater 33. The disk-shaped planar heater 33 comprises an electrical resistance layer sandwiched between two layers of thermally conductive synthetic resin material to electrically isolate the resistor element of the heater 33. Sandwiched between the rotating seal wheel 31 and planar heating element 33 is a bearing disk 34. The bearing disk 34 and heating element 33 assembly is preferably snugly seated within the confinement of projecting lip 36 of thermal insulator block 35. Notch 37 on lip 36 allows conductors 37 and 38 to connect heater 33 to a voltage source and temperature sensor leads 42 and 43 to connect to heater controller, and restricts the movement of the bearing disk 34 and heater 33 on the insulator block 35.

Planar heater 33 is energized by a regulated alternating-current source. Electrical control of the heater 33 is provided by a heat controller (not shown) within a control panel and at least one temperature sensor 44 mounted adjacent to the bottom of bearing disk 34. Temperature sensor 44 sends an electrical signal to the heat controller corresponding to the temperature of the bearing disk 34, whereby the controller selectively operates the heating element 33.

Figure 3C:
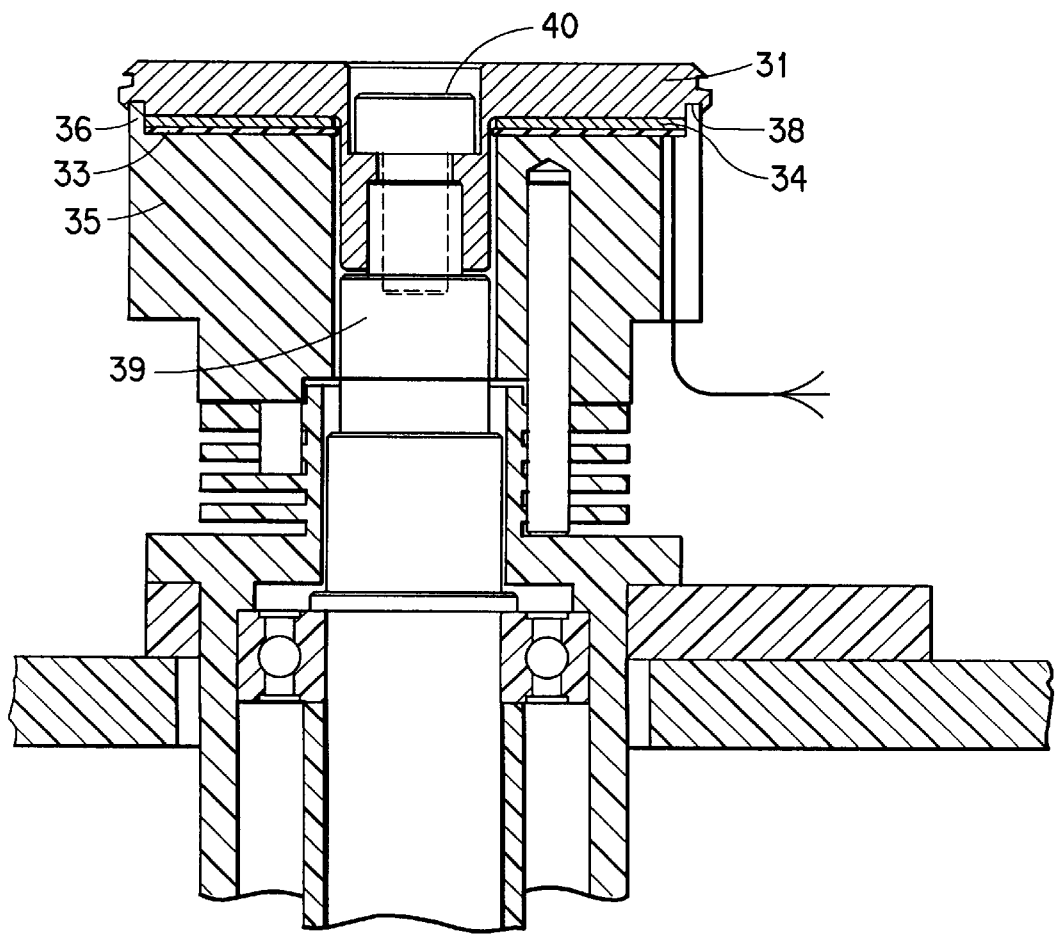
FIG. 3C is a cut-away view along line 3C—3C in FIG. 3B of the heat seal wheel assembly of the claimed invention.

FIG. 3C is a cut-away view showing the seal wheel assembly 20 of the present invention along line 3C—3C. As shown in the figure, annular projection lip 36 on the insulator block 35 projects into a circular groove 38 formed under the rim of seal wheel 31, forming a barrier protecting the bearing 34 seated within from debris which could destroy the bearing surface. As in the prior art, compression springs (not shown) arranged equally spaced around seal wheel drive shaft 39 and concentric to the heater axis and screw 40, forcing the insulator block 35, planar heating element 33, metal bearing disk 34, and seal wheel 31 in contact with one another to facilitate heat transfer.

Figure 3D:
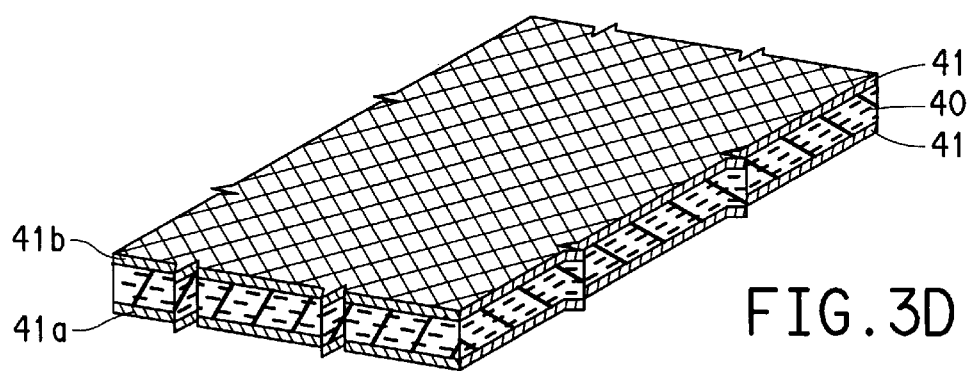
FIG. 3D is perspective view, showing the cut-away along line 3D—3D in FIG. 3B of an exemplary heating element employed in the heat seal wheel assembly of the claimed invention.

FIG. 3D is a perspective view of a preferred planar heating element 33 of the present invention. Electrical resistance heating of planar heating element 33 is accomplished by an electrical resistance layer 40 sandwiched between two thin sheets 41 of thermally conductive and electrically insulating materials, with the flow of current occurring in the plane of the layer. The electrical resistance layer 40 can be formed by an electrical resistance composition such as an electrically conductive composite material, in which the synthetic resins are mixed with metal compounds. The electrical resistance layer 40 of the present invention is preferably a thin etched resistance foil element. The electrodes (not shown) at either side of the electrical resistance layer can be covered with electrically insulating materials to prevent contact with the conductive parts. The sheet of materials 41 on either side of the electrical resistance layer 40 is a preferably a thermally conductive synthetic material which is also an electric insulator. It is possible for the resistance of the electrical resistance heating layer 40 to increase in the direction of outwardly radiation towards the seal wheel 31 by the use of several layers having different electrical resistance values. Additionally, the materials on either side of the electrical resistance layer 40 can comprise several layers of material held together by means of a bonding agent.

The preferred laminar heater of the present invention is commercially available from Tempco Electric Heater Corp. of Central Avenue, Wood Dale, Illinois, U.S.A., with a foil element layer in between two layers of silicone, requiring a minimum heating power of about 120 watts. The insulator block 35 can be of any type, but is preferably a NEMA G-7 phenolic laminate material. The bearing disk 34 is preferably of the same outside and inside diameter as planar heating element 33. The bearing disk 34 is preferably comprising a thin steel plate about 0.045" thick, with sintered bearing bronze bonded to the steel forming a matrix infused with lead and overlaid with Teflon (polytetrafluoroethylene). The preferred bearing disk 34 is available from Garlock Sealing Technologies of Palmyra, New York, U.S.A. The bearing disk structure of the preferred embodiment is self-lubricating, has high thermal conductivity, high-load bearing capability as well as expected long-life in service.

It is preferred that bearing disk 34 is preferably bonded to the top surface of the planar heating element 33 for intimate contact and maximum heat conduction. There should not be any air gaps in the bonding between the heater 33 and the bearing disk 34 to prevent any hot spots in between and to provide ultimate heat conduction.

As described above, the novel sealing apparatus of the present invention employing a planar heating assembly eliminates the maintenance and heating requirements of the heat seal wheel assembly used in the prior art. With a planar heater and a thick insulation block in the claimed invention, there is no hot surface for the trim to stick to. Additionally, only the top thin sealing disk rotates in operation, eliminating the trim wrap problems of the prior art.

Although the teaching of our invention has herein been discussed with reference to above-specific theories and embodiments, one skilled in the art will recognize and be able to practice many changes in the aspects of the invention as described, including variations which fall within the teachings of this invention. The spirit and scope of the invention should be limited only as set forth in the claims which follow.

What is claimed is:

1. A heat sealing apparatus for longitudinally sealing two opposite overlapping edges of a plastic film at an elevated temperature along a selected line in a direction parallel to the longitudinal axis of said film, forming a film tube, said apparatus comprising:

a) means for forming a film tube having an inlet end for receipt of a length of flat, flexible plastic film and for folding said film into a tubular shape with opposite elongate edges of the film overlapping, said means also having a discharge end;

b) a plurality of rotatable sealing wheels;

c) a plurality of bearing disks, one for each of said sealing wheel, each bearing disk having a top surface and a bottom surface with the top surface facing and in contact with said sealing wheel;

d) means for supplying said film tube to said sealing wheels in a contiguous seam arrangement;

e) means for heating said sealing wheels comprising plurality of planar heaters, one for each sealing wheel, each planar heater comprising a laminar resistive heating element sandwiched in between a top layer and a bottom layer of a thermally conductive and electrically insulative material, the top layer being in contact with the bottom surface of said bearing disk; and f) a support structure positioned under the bottom layer of said planar heater, comprising means to urge said planar heater and said bearing disk against said rotatable sealing wheel whereby said sealing wheel is heated by conduction by said planar heater.

2. The heat sealing apparatus of claim 1, wherein the thermally conductive and electrically insulative bottom layer of said planar heater is intimately bonded with the bottom surface of the bearing disk.

3. The heat sealing apparatus of claim 1, wherein said support structure comprises an insulator block.

4. The heat sealing apparatus of claim 1, wherein said bearing disk comprises a steel plate with the top surface facing and in contact with said sealing wheel being overlaid with polytetrafluoroethylene.

5. The heat sealing apparatus of claim 1, wherein said bearing disk comprises a steel plate with the top surface facing and in contact with said sealing wheel being infused with polytetrafluoroethylene.

6. The heat sealing apparatus of claim 1, wherein the thermally conductive and electrically insulative layer of said planar heater comprises silicone rubber.

* * * * *